US007002097B1

(12) United States Patent
Tzeng

(10) Patent No.: US 7,002,097 B1
(45) Date of Patent: Feb. 21, 2006

(54) SWITCHING DEVICE FOR MODE TRANSITION OF DC PLASMA TORCHES

(75) Inventor: Chin-Ching Tzeng, Yonghe (TW)

(73) Assignee: Atomic Energy Council-Institute of Nuclear Energy, Taoyuan (TW)

( * ) Notice: Subject to any disclaimer, the term of this patent is extended or adjusted under 35 U.S.C. 154(b) by 0 days.

(21) Appl. No.: 11/134,396

(22) Filed: May 23, 2005

(51) Int. Cl.
*B23K 10/00* (2006.01)

(52) U.S. Cl. ........................... 219/121.54; 219/121.52; 219/121.48; 219/121.57

(58) Field of Classification Search ........... 219/121.52, 219/121.54, 121.57, 121.48, 121.39, 121.45, 219/74, 75, 121.36; 313/231.31; 315/111.51
See application file for complete search history.

(56) References Cited

U.S. PATENT DOCUMENTS

| | | | | |
|---|---|---|---|---|
| 4,250,365 | A * | 2/1981 | McConnell | 218/95 |
| 5,208,441 | A * | 5/1993 | Broberg | 219/121.52 |
| 6,444,944 | B1 * | 9/2002 | Schneider et al. | 219/121.54 |
| 2004/0045942 | A1 * | 3/2004 | Norris et al. | 219/121.57 |

* cited by examiner

*Primary Examiner*—Mark Paschall
(74) *Attorney, Agent, or Firm*—Troxell Law Office, PLLC

(57) ABSTRACT

The present invention obtains an automatic mode switching of DC plasma torches through, which easily switches DC plasma torches to be run between a transmitting mode and a non-transmitting mode and put the switching device under the monitor and the control of a current sensor and a current level controller; the heat generated by the current passing through can be transferred by a non-combustible liquid driven by a pump and be cooled down through a heat exchanger; and, electric arcs is prevented from happening between two electrodes by the non-combustible liquid.

17 Claims, 3 Drawing Sheets

SWITCHING DEVICE FOR MODE TRANSITION OF DC PLASMA TORCHES

FIELD OF THE INVENTION

The present invention relates to a switching device; more particularly, relates to obtaining an automatic mode switching of DC plasma torches through easily switching DC plasma torches to be run between a transmitting mode and a non-transmitting mode and under the monitor and the control of a current sensor and a current level controller, which can be applied in the related melting process of the DC plasma torches.

DESCRIPTION OF THE RELATED ART

A DC plasma torch can generate a plasma with high temperature (more than 10,000° C.) and high energy density (10~80 MJ/kg, MJ means mega joule and kg means kilo gram) to be used in the welding, cutting and smelting of a metal and the melting process of a hazardous waste, etc. The operation modes of a DC plasma torch comprises a transmitting mode and a non-transmitting mode, where the operation mode is switched in between according to the target object and the operational process for convenience and effectiveness.

Figure 3:
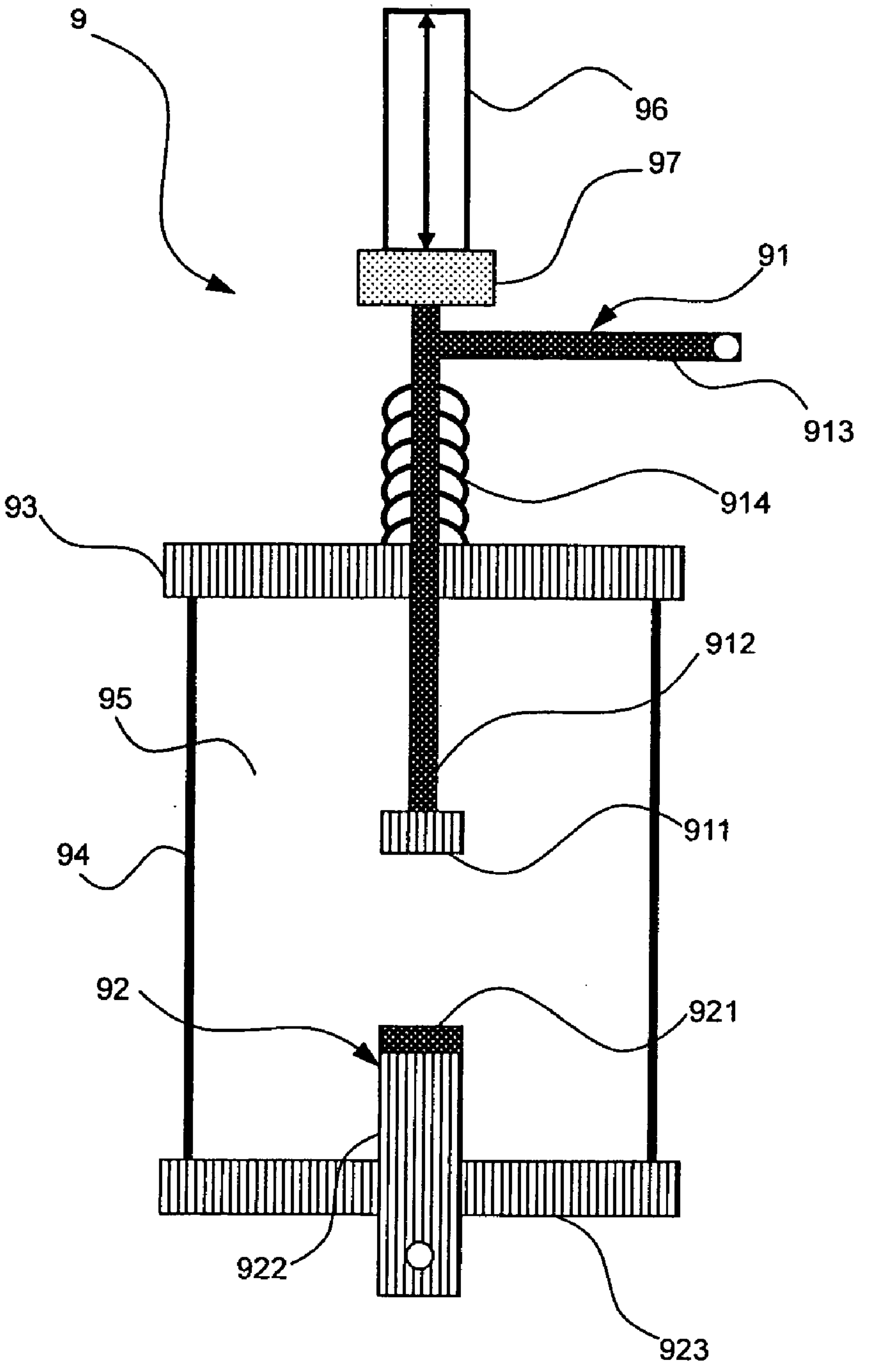
FIG.3 (Prior art)

Please refer to FIG. 3, which is a view showing the structure of an electric arc switching device according to a prior art. As shown in the figure, the prior art of an electric arc switching device 9 comprises a movable electrode unit 91, a fixed electrode unit 92, a sealed-up chamber 95, a driver 96 and an insulating board 97. The sealed-up chamber 95 is formed by vacuum-welding a top fixed metal sealing plate 93, a glass tube 94 (or a ceramic tube) and a bottom fixed metal sealing plate 923 sealed up with a metal telescopic duct 914 and a conductive linking rod 912 together with a bottom output end-plate 922 and the bottom metal fixed sealing plate 923, to obtain a gas-proof chamber. The sealed-up chamber 95 is made high-vacuumed through a vacuum treatment or is filled with an insulating gas (such as sulphur hexafluoride) or oil in the gas-proof chamber. A movable electrode 911 of the movable electrode unit 91 and a fixed electrode 921 of the fixed electrode unit 92 are changed from 'off' mode to 'on' mode by moving the driver 96 to prevent an electric arc from happening. Yet, the arc switching device 9 according to the prior art is made of metal and glass (or metal and ceramics) through welding, which is a breakable and is without any cooling device. When applying the prior art in the arc switching of a DC plasma torch, the arc switching device 9 is apt to be cracked owing to be overheated; and so its lifetime is short. Besides, its general operation is seriously affected and a fire accident is apt to happen. So, the prior art does not fulfill users' requests on actual use.

SUMMARY OF THE INVENTION

Therefore, the main purpose of the present invention is to provide a switching device for mode transition of DC plasma torches, which comprises a switch not apt to be cracked and a design for cooling down.

To achieve the above purpose, the present invention provides a switching device for mode transition of DC plasma torches, comprising a movable electrode unit, a fixed electrode unit, a driver, an insulating board and an insulated chamber. In the present invention, a current is outputted from an end (an anode or a cathode) of a DC power supplier. When a movable electrode is in touch with a fixed electrode, the switching device is in 'off' mode so that a DC plasma torch is run in a non-transmitting mode. A part of the current is entered into a rear electrode of the DC plasma torch to obtain electric arc plasma. Then, the part of the current is passed through a front nozzle electrode of the DC plasma torch; then is entered from a top output end-plate to a bottom output end-plate; and, in the end, is returned back to the other end of the DC power supplier 3 so that a circuit is obtained. Yet, some other part of the current is passed through a current sensor to be checked and is turned back to the other end of the DC power supplier. When the current reaches a setup value of a current level controller, a control signal is sent to move the driver so that the movable electrode and the fixed electrode are separated apart. At that time, a non-combustible liquid is used to isolate the movable electrode and the fixed electrode so that the DC plasma torch is run in a transmitting mode. Besides, the heat generated by the current passing through can be transferred by the non-combustible liquid driven by the pump and be cooled down through a heat exchanger. In this way, the present invention prevents the arc switching device from easy cracking and from short lifetime.

The present invention of a switching device for mode transition of DC plasma torches easily switches the mode of a DC plasma torch between a transmitting mode and a non-transmitting mode; and, under the monitor and the control of a current sensor and a current level controller, an automatic switching of the DC plasma torch is obtained. The present invention comprises a simple structure and the electric arc is prevented from happening between two electrodes by the non-combustible liquid so that the switching device has a capability of passing more than 3000 amperes of electricity and has a lifetime for at least 20000 times of switching.

BRIEF DESCRIPTIONS OF THE DRAWINGS

Figure 1:
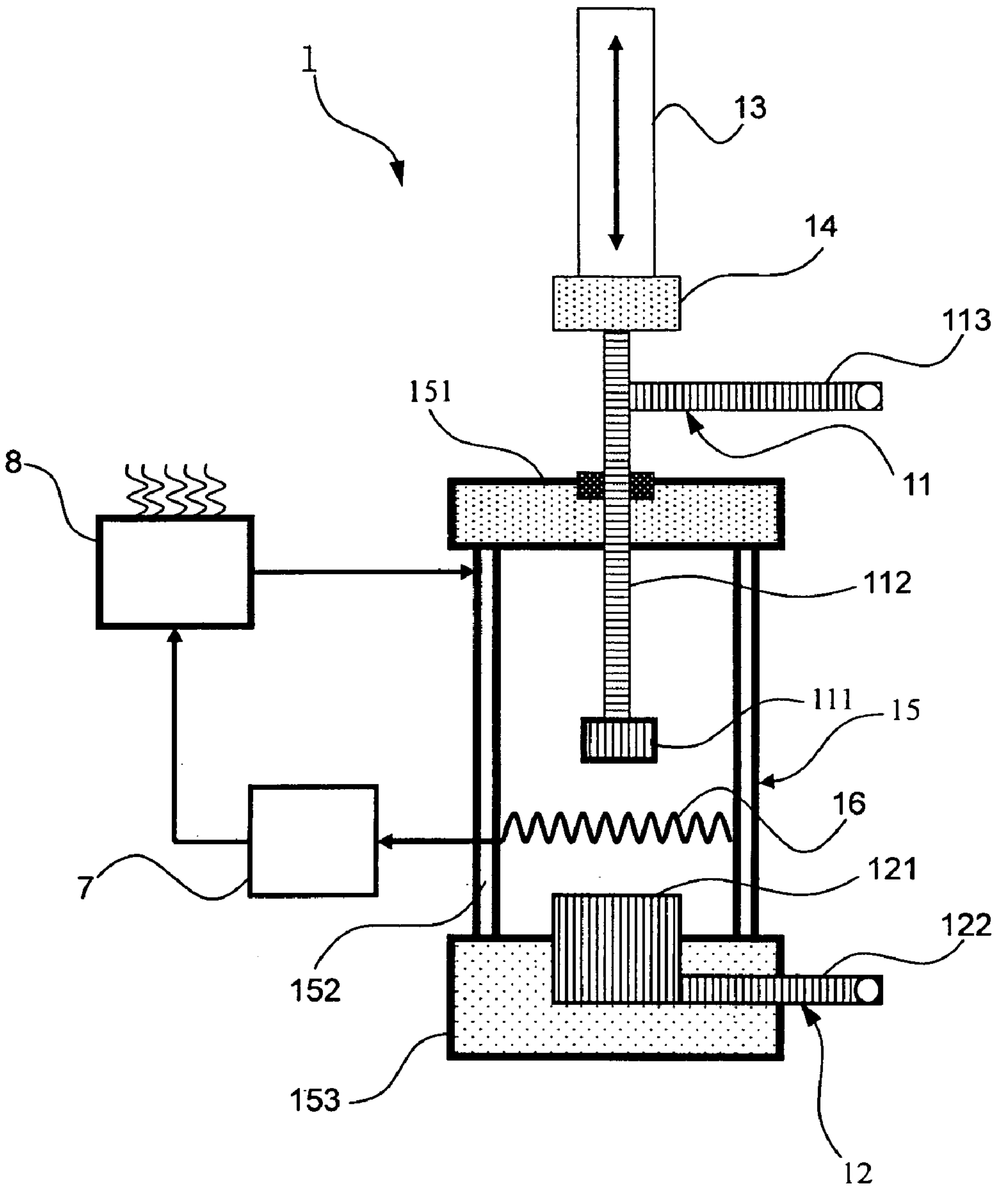
Figure 2:
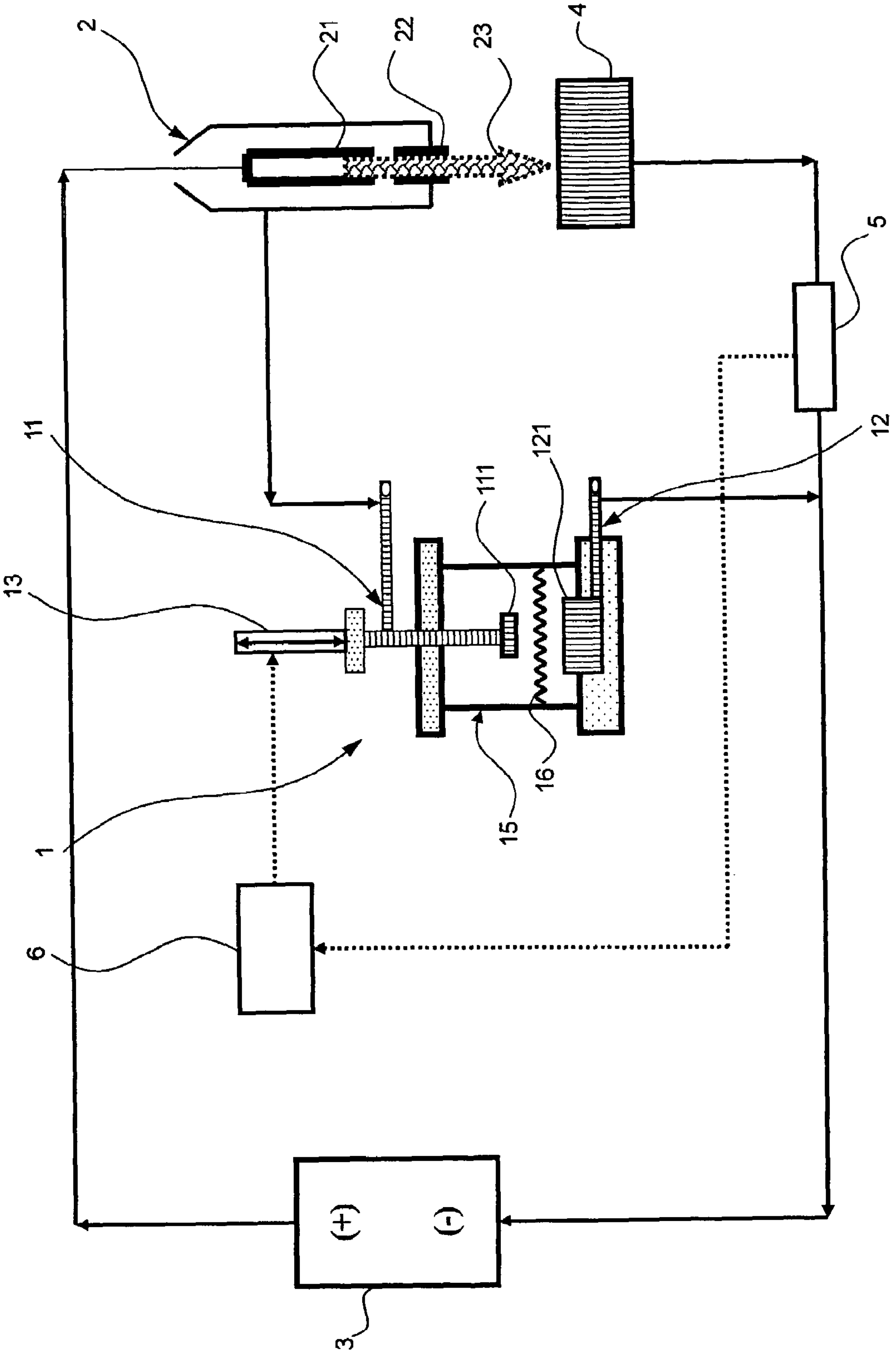

The present invention will be better understood from the following detailed descriptions of the preferred embodiments according to the present invention, taken in conjunction with the accompanying drawings, in which FIG. 1 is a view showing the structure of a switching device for mode transition of DC plasma torches according to the present invention;

FIG. 2 is a view showing the application of a switching device for mode transition of DC plasma torches according to the present invention; and FIG. 3 is a view showing the structure of an electric arc switching device according to a prior art.

DESCRIPTION OF THE PREFERRED EMBODIMENT

The following descriptions of the preferred embodiments are provided to understand the features and the structures of the present invention.

Please refer to FIG. 1, which is a view showing the structure of a switching device for mode transition of DC plasma torches according to the present invention. As shown in the figure, the present invention is a switching device for mode transition of DC plasma torches 1, comprising a movable electrode unit 11, a fixed electrode unit 12, a driver 13, an insulating board 14 and an insulated chamber 15. The movable electrode unit 11 and the fixed electrode unit 12 are insulated between each other; and, two airtight rooms are formed by the movable electrode unit 11, the fixed electrode unit 12 and the insulated chamber 15 for containing and circulating the insulating liquid (i.e. the non-combustible liquid). The movable electrode unit 11 comprises a movable electrode 111, a conductive linking rod 112 and a top output end-plate 113. The shape of the movable electrode 111 can be a circle, a square or any geometric shape; its material can be a material with high conductivity (such as a copper, an alloy of silver and copper, etc.); and, its cross-section area can be determined by a maximum current (200~10000 A) and a maximum current density (3~20 A/mm$^2$). The movable electrode 111 and the top output end-plate 113 are connected with each other by the conductive linking rod 112 to obtain a conducting channel. An end surface of the insulating board 14 is connected to an end of the conductive linking rod 112; and, the driver 13 (such as an air cylinder) is connected to another end surface of the insulating board 14. The fixed electrode unit 12 comprises a fixed electrode 121 and a bottom output end-plate 122. The shape of the fixed electrode 121 can be a circle, a square or any geometric shape; its material can be a material with high conductivity (such as a copper, an alloy of silver and copper, etc.); and, its cross-section area can be determined by a maximum current (200~10000 A) and a maximum current density (3~20 A/mm$^2$). The insulated chamber is formed with an insulated top fixed sealing plate 151, a double-layer insulating sleeve 152 and an insulated bottom fixed sealing plate 153 and is sealed up with an O-ring; its material can be a polyvinylidene difluoride (PVDF); and, it is filled with a non-combustible liquid 16 inside (such as a de-ionized water, a tap water, etc.). The non-combustible liquid 16 can be cooled down by being transferred by a pump 7 to a heat exchanger 8 and then being transferred back to the insulated chamber 15 through the insulating sleeve 152; and, its liquid level is between the movable electrode 111 and the fixed electrode 112. The non-combustible liquid 16 not only prevents an electric arc from happening between the movable electrode 111 and the fixed electrode 112, but also makes the above electrodes cooled down so that a current more than 3000 amperes can pass through the switching device 1 and the switching device 1 has a lifetime for at least 20000 times of switching.

Please refer to FIG. 2, which is a view showing the application of a switching device for mode transition of DC plasma torches according to the present invention. In the present invention, a current from an end (an anode or a cathode) of a DC power supplier 3 is outputted. When the movable electrode 111 of the movable electrode unit 11 is in touch with the fixed electrode 121 of the fixed electrode unit 12, the switching device 1 is in 'off' mode. A part of the current is entered into a rear electrode 21 of the DC plasma torch 2 to obtain electric arc plasma 23 so that the DC plasma torch 2 is run in a non-transmitting mode. Then, the part of the current is passed through a front nozzle electrode 22 of the DC plasma torch 2; and then is entered from the movable electrode unit 11 to the switching device 1. And, in the end, through the fixed electrode unit 12, the current is returned back to the other end (an anode or a cathode) of the DC power supplier 3 so that a circuit is obtained. Yet, some other part of the current is passed by the electric arc plasma 23 through a transmitting electrode 4 to be checked by a current sensor 5 and is returned back to the other end of the DC power supplier 3. When the transmitted current reaches a setup value of a current level controller 6, a control signal is sent to move the driver 13 so that the movable electrode 111 and the fixed electrode 121 are separated apart. And, the non-combustible liquid 16 in the insulated chamber 15 quickly covers the movable electrode 111 and the fixed electrode 121 to prevent electric arc from happening in the switching device 1 so that the DC plasma torch is run in a transmitting mode to obtain a function of arc switching for plasma torches.

The present invention is a switching device for mode transition of DC plasma torches, which easily switches the mode of a DC plasma torch between a transmitting mode and a non-transmitting mode; and where, under the monitor and the control of a current sensor and a current level controller, an automatic switching of the DC plasma torch is obtained. The present invention comprises a simple structure and the heat generated by the current passing through can be transferred by the non-combustible liquid driven by the pump and be cooled down through the heat exchanger; and the electric arc is prevented from happening between two electrodes by the non-combustible liquid, so that the switching device for mode transition of DC plasma torches has a lifetime for at least 20000 times of switching and the arc switching device is prevented from easy cracking and from short lifetime.

To sum up, the present invention is a switching device for mode transition of DC plasma torches, which switches the mode of a DC plasma torch between a transmitting mode and a non-transmitting mode with a simple structure so that the switching device can allow a big current to be passed through, can be switched for many times, and can be prevented from easy cracking.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A switching device for a mode transition of DC plasma torches, comprising:

a movable electrode unit, comprising a movable electrode, a conductive linking rod and a top output end-plate;

a fixed electrode unit, comprising a fixed electrode and a bottom output end-plate;

an insulating board with an end surface connected with an end of said conductive linking rod;

a driver connected to another end surface of said insulating board; and an insulated chamber formed with an insulated top fixed sealing plate, a double-layer insulating sleeve and an insulated bottom fixed sealing plate, and sealed up with an O-ring;

wherein said insulated chamber is filled with a non-combustible liquid inside and said non-combustible liquid is cooled down by being transferred by a pump to a heat exchanger and then being transferred back into said insulated chamber through said insulating sleeve;

wherein, when said movable electrode is in touch with said fixed electrode, a current from an end of a DC power supplier is entered into a rear electrode of a plasma torch; then passes through a nozzle electrode of said plasma torch; then, through said top output end-plate, is transferred to said bottom output end-plate; and, is transferred to another end of said DC power supplier to form a circuit to make said plasma torch run in a non-transmitting mode; and wherein said current is detected by a current sensor and is transferred back to said DC power supplier; when said current reaches a setup value of a current level controller, said current level controller outputs a control signal to move said driver to separate said movable electrode and said fixed electrode by said non-combustible liquid to make said plasma torch run in a transmitting mode.

2. The switching device according to claim 1 wherein, when said movable electrode is in touch with said fixed electrode, said switching device is in an turned-off mode.

3. The switching device according to claim 1, wherein a material for said fixed electrode is selected from a group consisting of a copper and an alloy of silver and copper.

4. The switching device according to claim 1, wherein a shape of said fixed electrode is selected from a circle and a square.

5. The switching device according to claim 1, wherein a cross-section area of said fixed electrode is determined by a maximum current and a maximum current density.

6. The switching device according to claim 5, wherein said maximum current is between 200 and 10,000 amperes and said maximum current density is between 3 and 20 amperes per millimeter square.

7. The switching device according to claim 1, wherein a material for said movable electrode is selected from a group consisting of a copper and an alloy of silver and copper.

8. The switching device according to claim 1, wherein a shape of said movable electrode is selected from a circle and a square.

9. The switching device according to claim 1, wherein a cross-section area of said movable electrode is determined by a maximum current and a maximum current density.

10. The switching device according to claim 9, wherein said maximum current is between 200 and 10000 amperes and said maximum current density is between 3 and 20 amperes per millimeter square.

11. The switching device according to claim 1 wherein a liquid level of said non-combustible liquid is set between said movable electrode and said fixed electrode.

12. The switching device according to claim 1, wherein said non-combustible liquid is selected from a group consisting of a de-ionized water and a regular water.

13. The switching device according to claim 1, wherein a material for said insulated chamber is a polyvinylidene difluoride.

14. The switching device according to claim 1, wherein said driver is an air cylinder.

15. The switching device according to claim 1, wherein two airtight rooms are obtained by said insulated chamber, said movable electrode unit and said fixed electrode unit.

16. The switching device according to claim 1, wherein said current is at least 200 amperes.

17. The switching device according to claim 1, wherein said switching device has a lifetime for at least 20000 times of switching.

* * * * *